United States Patent Office 3,250,808
Patented May 10, 1966

3,250,808
FLUOROCARBON ETHERS DERIVED FROM HEXAFLUOROPROPYLENE EPOXIDE
Earl Phillip Moore, Jr., Wilmington, Alwin S. Milian, Jr., Newark, and Herbert Sousa Eleuterio, Wilmington, Del., assignors to E. I. du Pont de Nemours and Company, Wilmington, Del., a corporation of Delaware
No Drawing. Filed Oct. 31, 1963, Ser. No. 320,549
19 Claims. (Cl. 260—535)

This application is a continuation-in-part of application Serial No. 858,308, filed December 9, 1959.

This invention relates to novel fluorine containing compounds, and, more particularly, to fluorocarbon ethers obtained from hexafluoropropylene epoxide.

The novel fluorocarbon ethers of the present invention have the general formulas

and $R_fO[CF(CF_3)CF_2O]_nCF(CF_3)COOM$, where $R_f$ is a fluoroalkyl radical or a fluoroalkoxyalkyl radical, $n$ is a number from zero on up and represents the number of $—CF(CF_3)CF_2O—$ units in the molecule, X is an amino radical, a halogen radical or a hydroxyl radical, and M is an alkyl radical, a metallic cation or an ammonium group including quternary ammonium groups. The novel fluorocarbon ethers of the present invention are obtained by reaction of hexafluoropropylene epoxide with acid fluorides, ketones, or with itself.

Hexafluoropropylene epoxide, which has the structure

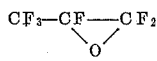

has recently been synthesized. As can be seen from the structure, the compound may also be termed 1,2-hexafluoropropylene oxide, or alternatively, perfluoromethyloxirane. A suitable process for the preparation of hexafluoropropylene epoxide is by the reaction of hexafluoropropylene with an alkaline aqueous solution of hydrogen peroxide at a temperature of $-50°$ C. to $50°$ C. and separating the hexafluoropropylene epoxide formed thereby. A practical illustration of such a process is as follows: Into a reaction flask was charged 300 g. of water, containing 40 g. of sodium hydroxide and 0.5 g. of sodium perfluorocaprylate. To the mixture was added, under agitation, 133 g. of an aqueous 30% hydrogen peroxide solution. The reaction temperature was adjusted to 22° C. and hexafluoropropylene, at a rate of 0.068 l./min, was delivered to the well agitated mixture below the level of the liquid by means of gas dispersion tube. The off-gas was collected in a cold trap from which the product, hexafluoropropylene epoxide, could be distilled. The off-gas was found to contain between 25% and 30% hexafluoropropylene epoxide.

The fluorocarbon ethers of the present invention are obtained by the reaction of hexafluoropropylene epoxide with itself, fluoroalkanoic acid fluorides or fluoroalkanones using various catalyst systems. Thus, the reaction can be carried out in bulk using either activated charcoal or high energy, particulate inonizing radiation. Although temperature is not a critical factor in this reaction, it is preferred to carry the reaction out at temperatures $-50$ to $+80°$ C.

In another method, the reaction products of the present invention are obtained by reacting the hexafluoropropylene epoxide with itself, the ketone or the acid fluoride in a polar organic solvent. Suitable solvents ar organic solvents liquid at the reaction temperature and capable of dissolving, i.e., to an extent of greater than 0.01 weight percent, perfluorocarbon alkoxides of alkali metals and, specifically, potassium perfluoropropoxide. The perfluoroalkoxides can be formed by reaction of metal fluorides with perfluoroacyl fluorides. In particular, however, the preferred organic solvents are aliphatic polyethers having from 4 to 16 carbon atoms and hydrocarbon nitriles having from 2 to 10 carbon atoms, such as the dimethyl ether of diethylene glycol, dioxane, propionitrile, benzonitrile and acetonitrile. Other highly polar solvents which meet the foregoing qualifications but which are not nitriles nor polyethers include dimethly sulfoxide, N-methyl pyrrolidone, nitroethane and tetrahydrofuran.

The catalysts which are employed in combination with the solvent are monovalent metal fluorides, particularly alakali metal fluorides, quaternary ammonium fluorides and alkali metal perfluoroalkoxides. The metal fluorides may be used as such or admixed with other alkali metal halides. Such mixtures are, for example, mixtures of LiCl/CsF, LiCl/KF and LiBr/KF. Catalyst concentration is not critical and amounts of catalyst are determined by the environment in which the reaction is carried out. In general, the concentration of the catalyst is at least 0.01% by weight of the hexafluoropropylene epoxide. The catalyst may be present either in solution or as a separate phase.

Reaction temperatures may be greatly varied from $-80°$ C. to $200°$ C. although a preferred range is from $-30°$ C. to $100°$ C. Pressures ranging from below atmospheric pressure to several hundred atmospheres have been employed and it has been established that pressure is not a critical factor in the process. Pressure is primarily employed for convenience depending on the physical properties of the reactants at any selected reaction temperature. It will be apparent that the ethers of the present invention are to a large majority polymers of hexafluoropropylene epoxide obtained by addition of hexafluoropropylene epoxide to either another epoxide, ketone, or an acid fluoride molecule. The degree of polymerization obtained depends on the catalyst, the temperature, and where an acid fluoride or ketone is present, on the ratio of such to the epoxide. At the high temperatures of the above indicated range a lower degree of polymerization is obtained than at the low end of the temperature range as a result of competing side reactions which occur at the high temperatures. Where the acid fluoride is employed, a ratio of acid fluoride to epoxide which is one or greater than one results in only the monoaddition product. As the ratio is decreased, products with higher degrees of polymerization are obtained. It is, however, to be realized that this control over the nature of the fluorocarbon ethers produced in the reaction is not absolute and does not prevent the formation of some fluorocarbon ethers of either higher or lower molecular weight or both.

The fluorocarbon ethers of the present invention are obtained from the reaction in the form of the acid fluoride and have the general formula

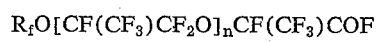

where $R_f$ and $n$ have the above-indicated meanings. The acid fluoride form of the ether is readily converted to the acid form by contact with water. The fluorocarbon ether acids, $R_fO[CF(CF_3)CF_2O]_nCF(CF_3)COOH$, are strong fluorocarbon acids that have chemical reactivity which is analogous to that of other fluorocarbon acids insofar as the carboxylic acid group is concerned. Thus, the acids and also the acid fluorides react with alkylamines and aralkylamines, such as methyl amine, dimethyl amine, butyl amine, higher normal and branched primary and secondary amines, benzyl amine, benzedrine and phenyl ethyl amines. Diamines, such as hexamethylene diamine may also be employed in the formation of the amide.

Esters can be formed by reaction with alkanols and aromatic alcohols such as methanol, ethanol, phenol, benzyl alcohol and glycols. Metal salts are formed from the acid or the acid fluorides by reaction of the oxides and hydroxides of both monovalent and polyvalent metals such as the alkali metals, the alkaline earth metals, aluminum and metals of Groups II B and III B of the Periodic Table of Elements. Reaction of the sodium salt with ammonium salts or quaternary ammonium salts $(R_4N)^+X^-$, where R is a hydrocarbon radical gives rise to the corresponding fluorocarbon ether ammonium salts.

The novel fluorocarbon ether products vary in their degree of polymerization from simple addition products to very high molecular weight solid products. Thus, the addition products include $CF_3OCF(CF_3)COF$,

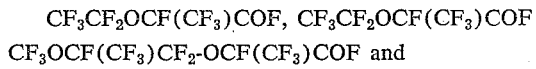

$CF_3OCF(CF_3)CF_2\text{-}OCF(CF_3)COF$ and

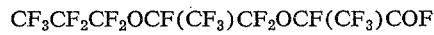

Higher molecular weight products in which $n$ is up to 100 are obtained without any difficulty. Up to $n=100$, the polyethers are still liquid at normal temperatures. Very high molecular weight products resulting in glass-like solids are obtained with greater difficulty and require low temperatures and long polymerization times.

The acid fluorides employed in the present invention are, in addition to carbonyl fluoride, the acid fluorides of fluoroalkanoic acids, $R'R_fCFCOF$, where $R'$ is a hydrogen, a halogen, a fluoroalkyl radical, a fluoroalkoxy radical or a fluoroalkoxyalkyl radical of one to six oxygen atoms, said alkyl, alkoxy and alkoxyalkyl radicals having from one to 14 carbons preferably, and where $R_f$ is a fluorine or a perfluoroalkyl radical of one to 14 carbon atoms. The preferred acid fluorides are the substantially perfluorinated acid fluorides, i.e., containing not more than one non-fluorine substituent such as a hydrogen or a different halogen. Examples of the acid fluorides employed in the present invention are $COF_2$, $CF_3COF$, $CF_3CF_2COF$, $CF_3CF_2CF_2COF$, $F(CF_2)_6COF$ $H(CF_2)_6COF$, $(CF_3)_2CFCOF$, $ClCF_2COF$ $CF_3CF_2OCF_2COF$, $CF_3CF_2CF_2OCF(CF_3)COF$

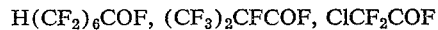

The ketones employed in the formation of the novel polyesters have the general formula $R''CF_2COCF_2R'''$, where $R''$ and $R'''$ are hydrogen, fluorine and fluoroalkyl radicals of one to 6 carbon atoms which are preferably substantially fluorinated. Examples of such ketones are $CF_3COCF_3$, $HCF_2COCF_2H$, $ClCF_2COCF_2Cl$ $CF_3COC_2F_5$, $C_2F_5COC_2F_5$, $C_3F_7COC_3F_7$, $CF_3COC_3F_7$ and $F(CF_2)_6COCF_3$.

The preparation of the novel fluorocarbon ethers of the present invention is further illustrated by the following examples. Unless otherwise stated, all parts and percentages used herein are by weight.

*Example I*

A 25 g. sample of hexafluoropropylene epoxide was placed in a glass tube, 15 cm. long and 3.5 cm. O.D. having 1 mil walls, which was equipped with a side arm condenser which was cooled with liquid nitrogen. The walls of the tube were sprayed with methanol which had been cooled to about −55° C. by solid carbon dioxide. A beam from a Van de Graaff generator was focused on the tube. The hexafluoropropylene epoxide was irradiated at two million electron volts and 125 microamperes for two 5 minute periods, and then at two million electron volts and 250 microamperes for 3 additional 5 minute periods. After the materials, volatile at room temperature, were allowed to distill off, there was recovered 4.7 g. of a heavy, brown, viscous oil which was stripped under vacuum in a thoroughly dried glass still.

At vapor temperatures up to 82° C. and pressures down to 1.5 mm., there was collected 0.62 g. of distillate. By raising the vapor temperature to 121° C. under a pressure of less than 0.5 mm., there was collected another 0.73 g. of distillate. The pot residue, which constituted the greater portion of the charged material, was analyzed and found to contain 22.7% carbon and 67.3% fluorine as compared to 21.7% carbon and 68.6% fluorine predicted on a theoretical basis, proving that the polymer formed was a polymer of hexafluoropropylene epoxide and not polyhexafluoropropylene formed from the decomposition of hexafluoropropylene epoxide to hexafluoropropylene. Substantially the same results were obtained by substituting as an irradiation source a linear accelerator for the Van de Graaff generator of this example.

*Example II*

Into a platinum tube at −78° C. under autogenous pressure was charged 14 g. of hexafluoropropylene epoxide and 1 g. of "Darco 12 x 20" charcoal which had been previously heated under vacuum at 400° C. for 48 hours. After 48 hours at −15° C., there was recovered 12.2 g. of polymer oil, 0.2 g. of hexafluoropropylene epoxide dimer, 0.8 g. of unreacted epoxide and a trace of perfluoropropionyl fluoride. By means of infrared analysis, the oil was determined to be a polymer of hexafluoropropylene epoxide. The dimer was identified by means of infrared analysis as perfluoro-2-propoxypropionyl fluoride. The major infrared absorption peak was at 8.0 microns. Other peaks occurred at 5.3, 7.4, 7.5, 8.6, 8.8, 9.0, 9.8 and 10.0 microns.

*Example III*

Using substantially the same procedure as Example II, 14 g. of hexafluoropropylene epoxide at −15° C. and autogenous pressure was contacted with 1.0 g. of "Columbia SA" charcoal which had been heated to 400° C. under vacuum for 48 hours. There was recovered 2.4 g. of oily polymer, 2.4 g. of dimer and 0.7 g. of perfluoropropionyl fluoride and 7.6 g. of unreacted hexafluoropropylene epoxide. The dimer which was identified as perfluoro-2-propoxypropionyl fluoride had a boiling point of 55° C. to 57° C. at atmospheric pressure. The oily polymer was identified as hexafluoropropylene epoxide polymer by means of infrared analysis. A sample of the polymer was heated to 600° C. and was found to be stable at that temperature.

*Example IV*

Using substantially the procedure set forth in Example II, 1200 grams of hexafluoropropylene epoxide was polymerized. There was recovered 149 grams of perfluoro-2-propoxypripionyl fluoride having an atomspheric boiling point of 55° C. to 57° C., 50 grams of the trimer of hexafluoropropylene epoxide having an atmospheric boiling point of 114° C. to 115° C., 671 grams of oil boiling in the range of 115°/760 mm. to 285°/0.12 mm. and 38 grams of polymer oil having a boiling point of greater than 285° C. at 0.12 mm. of Hg pressure and a degree of polymerization of $n=50$ to 70. The trimer of hexafluoropropylene epoxide was found to have the structure

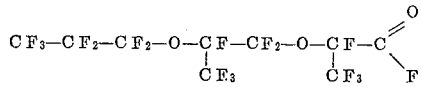

The major infrared band for the trimer was at 8.1 microns. Other infrared absorption bands occurred at 5.3, 7.5, 8.3, 8.7, 9.9, 10.0, and 10.2 microns. A carbon analysis of the trimer gave 21.5% carbon as compared to calculated analysis of 21.7%. Carbon analysis of the non-distillable oil gave 21.8% as compared to calculated analysis of 21.7% carbon based on $[C_3F_6O]_n$. Infrared analysis of the oils gave major absorption peaks at 5.3, 7.6, 8.1, 8.4, 8.8 and 10.2 microns. The 8.1 micron peak was the most intense. Products having a boiling point between the trimer and the non-distillable oil have substantially the same carbon analysis as the non-distillable oils.

Example V

A portion of the perfluoro-2-propoxypropionyl fluoride prepared in Example IV was treated with methanol to convert the dimer into the corresponding methyl ester. The product was methyl perfluoro-2-propoxypropionate having a boiling point of 109° C. to 110° C. at a atmospheric pressure. A carbon/fluorine analysis of the methyl ester gave 24.4% carbon and 60.8% fluorine as compared to 25.4% carbon and 61.2% fluorine calculated on a theoretical basis.

Example VI

A portion of the perfluoro-2-propoxypropionyl fluoride in Example IV was treated with a mixture of ice and ammonium hydroxide solution to convert the dimer to the corresponding amide. After recrystallization from chloroform, there was obtained a white crystalline solid having a melting point of 58° C. Infrared analysis identified the solid as prefluoro-2-propoxypropionamide.

Example VII

Forty grams of perfluoro-2-propoxypropionyl fluoride prepared in Example IV was dissolved in 50 ml. of dodecafluorodimethylcyclobutane. This solution was added to 150 ml. of water and stirred vigorously for 60 minutes. The fluorocarbon layer and the aqueous layer were separated. The aqueous layer was washed several times with additional dodecafluorodimethylcyclobutane. The fluorocarbon layer and the washings were combined and distilled. There was recovered 26 grams of crude acid. The crude acid was distilled through a spinning band column to yield 21 grams of pure perfluoro-2-propoxypropionic acid having a boiling point of 143° C. to 144.5° C. at atmospheric pressure. Infrared spectrum of the product showed principal absorption peaks at 3.2, 5.7, 7.5, 7.6, 8.1 (the most intense peak), 8.3, 6.7, 8.9, 9.6 and 10.1 microns. A carbon/hydrogen analysis of the acid gave 21.9% carbon and 0.4% hydrogen, as compared to 21.8% carbon and 0.31% hydrogen calculated on a theoretical basis. The equivalent weight was determined by titration to be 333 compared to 330 on a theoretical basis. The acid was found to be a highly active dispersing agent. The lithium and sodium salts of the acid were prepared and were likewise efficient surface active agents.

Example VIII

A portion of the trimer prepared in Example IV was treated with methanol to yield the methyl ester having a boiling point of 90° C. to 91° C. at 90 mm. Hg. A carbon/hydrogen analysis gave 23.2% carbon and 0.7% hydrogen compared to a theoretical analysis of 23.5% carbon and 0.59% hydrogen.

Example IX

In 20 ml. of dodecafluorodimethylcyclobutane was dissolved 24.8 grams of the trimer prepared in Example IV. This solution was added to 100 ml. of 5.5% potassium hydroxide and the mixture was stirred vigorously for 60 hours. After acidification with hydrochloric acid and distillation there was obtained 6.2 grams of a pure acid boiling at 143° C. at 17 mm. Hg. The acid, which had the structure

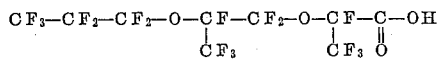

had the principal infrared absorption peaks at 3.2, 5.6, 7.5, 7.7, 8.1 (the most intense), 8.3, 8.7, 9.6, 10.1 and 10.2 microns. The compound had 22.0% carbon and 0.64% hydrogen and an equivalent weight of 477 compared to 21.8% carbon, 0.2% hydrogen and an equivalent weight of 496 calculated on a theoretical basis.

Example X

Ten grams of the polymer oil described in Example IV was dissolved in 15 ml. of dodecafluorodimethylcyclobutane and stirred with 20 ml. of water for three hours. After separation of the layers, the fluorocarbon solvent was stripped from the product in vacuo. The product was a polymer of hexafluoropropylene epoxide having acid end groups. An infrared spectrum of the product had absorption peaks at 5.6, 7.7, 8.1 (the most intense), 8.5, 8.8, 9.6 and 10.2 microns.

Example XI

Using substantially the same equipment and procedure as Example II, there was prepared a hexafluoropropylene epoxide polymer oil having a boiling point greater than 210° C. at 0.25 mm. Hg. The viscosity of the polymer as determined by ASTM-D-341 was 0.604 and the viscosity index (ASTM-D-567) was 118. The pour point of the polymer (ASTM-D-97) was −35° F.

Example XII

Under a dry nitrogen atmosphere 28.6 parts of "Darco" 12 x 20 mesh activated carbon were placed in a stainless steel cylinder. The sealed cylinder was cooled in liquid nitrogen and 400 parts of hexafluoropropylene epoxide were charged into the cylinder. The reaction was cooled to from about −10° to −15° C. where it was maintained for three days. The product was then fractionally distilled.

| Product $F[CF(CF_3)-CF_2-O-]_nCF(CF_3)COF$ $n$=average | Boiling point, ° C./mm. Hg |
|---|---|
| 5 | 53–63/0.3 |
| 6 | 63–76/0.35 |
| 7 | 81–100/0.4 |
| 8 | 100–112/0.35 |
| 11 | 138–156/0.4 |
| 12 | 156–173/0.4 |
| 13 | 170–185/0.4 |
| 15 | 190–205/0.4 |

The conversion of hexafluoropropylene was about 75%.

Example XIII

Into a 320 ml. stainless steel vessel was charged 8 g. of cesium fluoride, 20 ml. of the dimethyl ether of diethylene glycol, 35 g. of trifluoroacetyl fluoride and 97 g. of hexafluoropropylene epoxide. The vessel was sealed and heated for 6 hrs. at 50° C. A liquid fluorocarbon material, 56 ml., was obtained. Distillation of this material yielded 24 g. of 3,6-dioxa-2,4-di(trifluoromethyl)nonafluorooctanoyl fluoride, B.P. 96°/760 mm. Hg. Infrared and nuclear magnetic resonance analyses of this compound are consistent with the formula $CF_3CF_2\text{-}O\text{-}CF(CF_3)\text{-}CF_2\text{-}O\text{-}CF(CF_3)\text{-}COF$ Analysis of the residue showed it to contain polyethers of higher molecular weight having the general formula

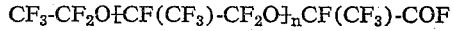

where $n$ ranged from 2 to 5.

The 3,6-dioxa-2,4 - di(trifluoromethyl)nonafluorooctanoyl fluoride was hydrolized with water and the resulting fluorocarbon layer was separated and dried by the distillation of benzene. The residue was then distilled in vacuo and yielded the anhydrous acid B.P. 54°/1.8 mm. Hg.

*Analysis.*—Calc. for $C_8F_{15}O_4H$: C, 21.7; H, 0.2; F, 63.7; and N. eq., 442. Found: C, 21.7, 21.6; H, 0.3, 0.4; F, 63.4, 63.5; and N. eq., 456, 451.

The acid was treated with ammonia in ether solution which converted it to the ammonium salt. Treatment with 10 N KOH converts the acid to the potassium salt.

Example XIV

Into a 320 ml. stainless steel vessel was charged 25 g. of cesium fluoride, 40 ml. of diethylene glycol dimethyl ether, 38 g. of carbonyl fluoride and 193 g. of hexafluoropropylene epoxide. The vessel was sealed and heated for 6 hrs. at 50° C. The liquid contents of the tube were distilled, yielding 20 g. of 3,6-dioxa-2,4-di(trifluoromethyl)heptafluoroheptanoyl fluoride. The residue contained polyethers of higher molecular weights having the general formula $$CF_3[OCF(CF_3)\text{-}CF_2]_nO\text{-}CF(CF_3)\text{-}COF$$

where $n$ is from 2 to 6.

The heptanoyl fluoride was hydrolyzed by treatment with 10 ml. of water, and the fluorocarbon layer was separated and dried by azeotrope distillation of the water with benzene. The residue was distilled and 8.6 g. of the acid, B.P. 68°/16 mm. Hg was obtained.

*Analysis.*—Calc. for $C_7F_{13}O_4H$: C, 21.2; H, 0.2; F, 62.4; and N. eq. 396. Found: C, 21.4, 21.7; H, 0.22, 0.2; F, 58.0, 58.4; and N. eq., 395.

Infrared and nuclear magnetic resonance data are consistent with the structure $$CF_3\text{-}O\text{-}CF(CF_3)\text{-}CF_2\text{-}O\text{-}CF(CF_3)\text{-}COOH$$

The acid was treated with ammonia in ether solution to convert it to the ammonium salt.

A substantially similar result is obtained by employing the foregoing procedure with silver fluoride or tetramethyl ammonium fluoride.

*Example XV*

Into a stainless steel autoclave there was charged 30 g. of cesium fluoride and 75 ml. of diethylene glycol dimethyl ether. The vessel was cooled to —80° C., evacuated and charged with 66 g. of carbonyl fluoride and 83 g. of hexafluoropropylene epoxide. The vessel was closed and heated to 75° C. for 4 hrs. Low temperature distillation afforded 3 g. of hexafluoropropylene epoxide and 82 g. of perfluoro-2-methoxypropionyl fluoride, B.P. 10 to 12° C. A substantially similar result is obtained when the cesium fluoride is replaced with silver fluoride or tetramethyl ammonium fluoride.

The acid fluoride is converted to the acid by adding water to the acid fluoride; neutralization of the resulting acid with 10 N KOH results in the formation of the potassium salt of perfluoro-2-methoxy perfluoropropionic acid.

*Example XVI*

Into a platinum tube 6" x 0.5", sealed at one end, was charged 0.55 g. of "Darco" activated carbon. The tube was evacuated, heated to 600° C., cooled and charged with 3.4 g. of perfluoroacetyl fluoride and 3.4 g. of hexafluoropropylene epoxide. After sealing, the reaction mixture was maintained at —15° C. for 48 hrs. On opening, there was obtained an 89% yield, based on hexafluoropropylene epoxide, of perfluoro-2-ethoxypropionyl fluoride, B.P., 30 to 33° C. The nuclear magnetic resonance and infrared spectra of the product were consistent with the assigned structure. The acid fluoride is converted to the acid by the addition of water. Neutralization with NaOH results in the formation of the sodium salt of perfluoro-2-ethoxy perfluoropropionic acid.

*Example XVII*

Into a 320 ml. stainless steel reaction vessel was charged 11.6 g. of cesium fluoride and 20 ml. of diethylene glycol dimethyl ether. The vessel was cooled to —80° C. and evacuated. There was then added 60 g. of perfluoroisobutyryl fluoride and 43 g. of hexafluoropropylene epoxide. The bomb was heated to 100° C. for 4 hrs. Distillation of the liquid product afforded 10 g. of perfluoro-2-isobutoxypropionyl fluoride, B.P. 76 to 78° C. An infrared spectrum of the product was consistent with the assigned structure. A substantially similar result is obtained when the cesium fluoride is replaced with silver fluoride or tetramethyl ammonium fluoride.

The acid fluoride is converted to the acid by adding water to the acid fluoride; neutralization of the resulting acid with 10 N KOH results in the formation of the potassium salt of perfluoro-2-isobutoxy perfluoropropionic acid.

*Example XVIII*

Using the procedure of Example XVII, the following fluorocarbon ether acid fluorides are prepared from perfluoroalkanoic acid fluorides containing from 5 to 8 carbon atoms.

| Acid fluoride: | Boiling point in ° C. |
|---|---|
| $n\text{-}C_5F_{11}\text{-}O\text{-}CF(CF_3)\text{-}COF$ | 101–103 |
| $n\text{-}C_6F_{13}\text{-}O\text{-}CF(CF_3)COF$ | 121–125 |
| $n\text{-}C_7F_{15}\text{-}O\text{-}CF(CF_3)COF$ | 142–146 |
| $n\text{-}C_8F_{17}\text{-}O\text{-}CF(CF_3)COF$ | 163–167 |

*Example XIX*

Into a 50 ml. glass reaction flask was charged under nitrogen 2 ml. of the dimethyl ether of diethylene glycol and 0.1 g. of cesium fluoride. The reaction vessel was cooled to 0° C., evacuated, charged with 13.6 g. of hexafluoropropylene epoxide and agitated for a period of 15 minutes. The pressure in the reaction vessel was atmospheric. The reaction was then cooled to —80° C. and agitated at that temperature for 16 hours. The resulting reaction mixture was separated and 2.5 g. of polymeric hexafluoropropylene epoxide oil obtained.

*Example XX*

Into a 50 ml. glass reaction flask was charged 2 ml. of the dimethyl ether of diethylene glycol and 0.1 g. of cesium fluoride. Hexafluoropropylene epoxide was then charged to the reaction vessel until a pressure of +5 p.s.i. was attained. The vessel was agitated at a temperature of 25 to 30° C. for a period of one hour. The pressure was maintained at the indicated level by the further addition of the epoxide. The resulting product, being insoluble in the diluent, was separated and 57 g. of a polymer having the formula $$CF_3\text{-}CF_2\text{-}CF_2\text{-}O[CF(CF_3)\text{-}CF_2\text{-}O]_nCF(CF_3)COF$$

where $n$ varied from 4 to 6, was obtained.

*Example XXI*

Into a dry, 180 ml. stainless steel tube, previously flushed with nitrogen, is placed 28 g. of cesium fluoride and 28 g. of diethylene glycol dimethyl ether. The tube is closed, cooled to —80° C. and evacuated. Hexafluoroacetone, 50 g., is then charged into the tube followed by 50 g. of hexafluoropropylene epoxide. The tube is then heated with agitation under autogenous pressure at 50° C. for 3 hours and then at 80° C. for 3 hours. After separation from the reaction medium and removal of the catalyst by filtration, the product is distilled and results in a 50 percent yield of perfluoro-2-isopropoxypropionyl fluoride, B.P. 57° C. at atmospheric pressure.

The acid fluoride is converted to the acid by adding water to the acid fluoride; neutralization of the resulting acid with 10 N KOH results in the formation of the potassium salt of perfluoro-2-isopropoxypropionic acid.

The perfluoro-2-isopropoxypropionyl fluoride is dehalocarbonylated by passage through a bed of dry potassium sulfate pellets at 300° C. with a contact time of 10 minutes. The major product isolated is perfluoroisopropyl perfluorovinyl ether, B.P. 35° C.

Ammonia is passed through an aqueous solution of perfluoro-2-isopropoxypropionic acid at room temperature for 30 minutes. On evaporation of the water, there is obtained the perfluoro-2-isopropoxypropionamide.

*Example XXII*

The reaction of hexafluoropropylene epoxide and hexafluoroacetone described in Example XII is repeated except that 10 g. of hexafluoroacetone and 50 g. of hexafluoropropylene epoxide is employed. The resulting product has the formula

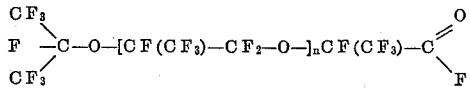

where $n$ varies from 1 to 6.

Example XXIII

The reaction described in Example XXI is repeated except that 1,3-dihydroperfluoroacetone is employed instead of the hexafluoroacetone. The product obtained on work-up is 1,3-dihydroperfluoroisopropoxy-2-perfluoropropionyl fluoride.

Example XXIV

The reaction described in Example XXI is repeated except that 2.7 g. of perfluoro-2-pentanone and 8.3 g. of hexafluoropropylene epoxide are employed. On distillation of the product there is obtained a mixture of the 1:1 adduct of perfluoro-2-pentanone and hexafluoropropylene epoxide of the structure

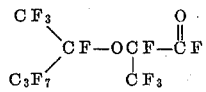

having a boiling point of 114–117° C., together with higher molecular weight products of the structure

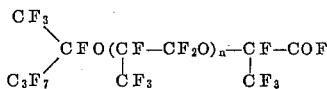

where $n$ varies from 1 to 6.

Example XXV

The procedure of Example XIV is repeated using perfluoroethoxyacetyl fluoride instead of carbonyl fluoride. On distillation of the reaction product, a range of products is obtained having the general formula $$CF_3CF_2OCF_2CF_2O[CF(CF_3)CF_2O]_nCF(CF_3)COF$$

where $n$ varies from zero to 6.

The foregoing examples are illustrations of certain embodiments of the present invention, and are not to be construed as limitations thereof. It is apparent that the reactions of the carboxylic acid group of the ether acids of the present invention are equivalent to those of straight fluorocarbon acids and, in fact, ester, amide and salt formation is readily achieved using techniques described in the literature for fluorocarbon acids.

The fluorocarbon ethers of the present invention are useful as lubricants, hydraulic fluids and the like. Because the fluorocarbon ether oils and greases are stable at exceptionally high temperatures, they are found to be particularly useful as lubricants and hydraulic fluids where operations are carried out over a wide range of temperatures. The acid and alkali salt forms of the fluorocarbon ethers are particularly useful as dispersing agents, surface active agents, and the like. The ester forms of the polymer are also useful as solvents and heat transfer media.

The fluorocarbon ethers of the present invention have, in addition to the aforesaid utility, utility as a chemical intermediate which is based on unusual chemical properties of these materials. Thus, it was discovered that the alkali metal salts of the fluorocarbon ethers can be decarboxylated by pyrolysis to give rise to vinyl ethers having the general formula

where $n$ is the degree of polymerization and $R_f$ has the above indicated meaning. This property is extremely surprising since it has been published that a similar ether acid, i.e., $C_2F_5OCF_2CF_2COONa$, does not give rise to the vinyl ether on pyrolysis (Wright Air Development Center Technical Report 56–234, page 6). The great ease with which the alkali metal salts of the described fluorocarbon ethers can be decarboxylated is believed to be due to the particular structure of the described polyethers wherein the ether oxygen is attached to the α-carbon atom of the acid radical, i.e., the structure

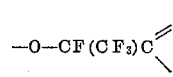

An additional unobvious property of the fluorocarbon polyethers is their ability to decompose to perfluoropropionyl fluorides in the presence of fluoride ions. Contrary to perfluoroalkanoic acid fluorides and acid fluorides having the formula $R_f$—O—$CF_2$—$CF_2$—COF which decompose with the formation of $COF_2$, and other decomposition products which, however, do not include the perfluoropropionyl fluoride, the acid fluorides of the present invention are unzippered to give rise to pure perfluoropropionyl fluoride which as an organic perfluorinated acid has a number of valuable applications.

We claim:

1. A fluorocarbon ether having formulas selected from the class consisting of

and

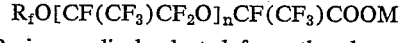

where $R_f$ is a radical selected from the class consisting of fluoroalkyl radicals and fluoroalkoxyalkyl radicals, wherein said alkyl and alkoxyalkyl radicals contain from one to sixteen carbon atoms, $n$ is a number from zero to 100, X is a radical selected from the group consisting of alkyl amino radicals, aralkyl amino radicals, halogen radicals and the hydroxyl radical, and M is a radical selected from the group consisting of alkyl radicals, alkali metal, alkaline earth metal, aluminum, and Group IIB and IIIB of the Periodic Table of Elements metal cations and ammonium groups.

2. A fluorocarbon polyether having the formula

where $R_f$ is a perfluoroalkyl radical of one to sixteen carbon atoms and $n$ is from zero to 100.

3. A fluorocarbon ether having the formula

where $n$ is from zero to 100.

4. A fluorocarbon ether having the formula

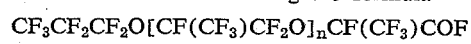

where $n$ is from zero to 100.

5. Perfluoro-2-methoxypropionyl fluoride.
6. Perfluoro-2-ethoxypropionyl fluoride.
7. Perfluoro-2-propoxypropionyl fluoride.
8. A fluorocarbon ether having the formula

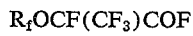

where $R_f$ is a perfluoroalkyl radical of one to sixteen carbon atoms.

9. A compound of the formula

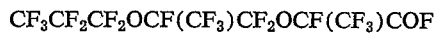

10. A fluorocarbon ether having the formula

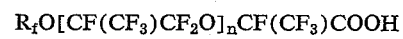

where $R_f$ is a perfluoroalkyl radical of one to sixteen carbon atoms and $n$ is from zero to 100.

11. Perfluoro-2-methoxypropionic acid.
12. Perfluoro-2-propoxypropionic acid.
13. A compound of the formula

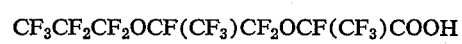

14. A compound having the formula

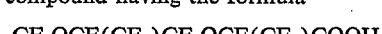

15. A fluorocarbon ether having the formula
$$CF_3CF_2CF_2O[CF(CF_3)CF_2O]_nCF(CF_3)COOH$$
where $n$ is from zero to 100.

16. A fluorocarbon ether having the formula
$$CF_3O[CF(CF_3)CF_2O]_nCF(CF_3)COOH$$
where $n$ is from zero to 100.

17. A fluorocarbon ether having the formula
$$CF_3CF_2OCF_2CF_2O[CF(CF_3)CF_2O]_nCF(CF_3)COF$$
where $n$ is from zero to 100.

18. Perfluoro-2-isopropoxypropionyl fluoride.

19. A process for the preparation of fluorocarbon ethers which comprises reacting a starting material selected from the class consisting of hexafluoropropylene epoxide, mixtures of hexafluoropropylene epoxide with carbonyl fluoride, and mixtures of hexafluoropropylene epoxide with perfluoroalkanoic acid fluorides of 2 to 14 carbon atoms at a temperature of $-50$ to $+80°$ C. with activated charcoal and recovering the fluorocarbon ether formed.

References Cited by the Examiner
UNITED STATES PATENTS

| | | | |
|---|---|---|---|
| 1,970,578 | 8/1934 | Scholler | 260—615 |
| 2,133,480 | 10/1938 | Scholler | 260—615 |
| 2,164,431 | 7/1939 | Scholler | 260—615 |
| 2,214,352 | 9/1940 | Scholler | 260—615 |
| 2,713,593 | 7/1955 | Brice | 260—535 |

LORRAINE A. WEINBERGER, *Primary Examiner.*

LEON ZITVER, *Examiner.*